Sept. 22, 1953  J. A. LOVE  2,652,672
LIFT TYPE AGRICULTURAL IMPLEMENT HAVING MULTIPLE SETS
OF TRANSVERSELY ARRANGED GROUND ENGAGING TOOLS
Filed Nov. 29, 1947

JABEZ A. LOVE.
INVENTOR

BY Oltsch & Knoblock.
ATTORNEYS

Patented Sept. 22, 1953

2,652,672

UNITED STATES PATENT OFFICE 2,652,672

LIFT TYPE AGRICULTURAL IMPLEMENT HAVING MULTIPLE SETS OF TRANSVERSELY ARRANGED GROUND ENGAGING TOOLS

Jabez A. Love, Silver Creek Township, Berrien County, Mich.

Application November 29, 1947, Serial No. 788,780

10 Claims. (Cl. 55—3)

This invention relates to improvements in lift type agricultural implements having multiple sets of transversely arranged ground engaging tools. Spring tooth harrows, spike tooth harrows, disk harrows and cultivators are illustrative of the implement of the type to which this invention pertains.

Lift type agricultural implements of this type are adapted for connection to a tractor by a conventional power actuated lift hitch, and particularly to a hitch of the type having three arms connected to the front of the implement at laterally and vertically spaced points so that at least one of the arms is in compression and the remaining arms are under tension in use. Implements for use with hitches of this type are commonly provided with rigid frames which have generally been necessary in order to avoid flexibility of the implement which would interfere with lifting of the implement to elevated position upon operation of the hitch. Thus, if a conventional flexible draw type implement was to be lifted by a lift hitch whose arms are all connected at its front end, the operation of the hitch in lifting direction would lift the front end of the implement but would entail a dragging of the rear portion of the implement at least during the initial lifting operation and until the front of the implement had been raised to a substantial elevation. The lift capacity of a lift hitch is limited and usually is insufficient to enable the lifting of a flexible implement sufficiently that the rear end of the implement as well as the front end would clear the ground.

The use of a rigid frame in an implement makes possible the lifting of the implement by the hitch but it also imposes undesirable limitations upon the implement in use. The three-point connection of the rigid implement frame with the arms of the hitch makes such a rigid framed implement a rigid rearward extension of the tractor. The implement always assumes the same attitude as the tractor as to both longitudinal and lateral inclination. The implement is not free to assume a position normal to the surface of the ground it engages if the tractor is tilted relative to that surface. A common condition encountered in use, in which this rigid relation of the implement to the tractor has a distinct disadvantage, is a condition entailed when one of the rear wheels of a tractor drops into a depression to produce a longitudinal downward rearward tilting of the tractor. The same condition can occur when newly plowed ground is being worked in a direction at an angle to the plow furrows. The fact that the implement constitutes a rearward rigid extension of the tractor causes the tools of the rear set or gang to dig into the ground at an undesirable and excessive depth when the tractor tilts downwardly and rearwardly. This imposes excessive stresses and strains upon both the implement and the tractor and may necessitate manipulation of the control of the hitch to lift the rear end portion of the implement to release the stress or strain, followed by a re-setting of the control of the hitch to normal when the attitude of the tractor returns to normal. Such re-setting of the control is onerous if it must be done by hand setting of the control and is objectionable even in cases where the control of a hitch has an automatic over-load response for controlling depth because of the irregular action of the ground working tools resulting from the operation of the hitch control.

The primary object of this invention is to provide an implement of this type which can be lifted by a hitch connected at its front end with the same facility that an implement provided with a rigid frame can be lifted but which overcomes the above mentioned disadvantages and limitations of implements provided with rigid frames.

A further object of the invention is to provide an implement of this type with two rigid frame parts, each mounting at least one transverse set or gang of ground working tools and pivotally connected together in tandem, wherein means are provided to so connect the two frame units that downward tilting of the rear frame part relative to the front frame part is limited without restricting freedom of the rear frame part to tilt upwardly.

A further object is to provide an implement of this type with a rigid front frame mounting one transverse set of ground working tools and three hitch connectors spaced transversely and vertically thereof, a rigid rear frame mounting a second transverse set of tools and pivoted to the lower part of the front frame, and a flexible member connected to the upper part of the front frame and to the rear part of the rear frame to suspend the rear frame when the implement is lifted.

A further object is to provide a spring tooth harrow with a rigid front frame having multiple spaced hitch connectors and including a transverse tool bar and an upwardly projecting super structure, a rigid rear frame including a transverse tool bar and a plurality of longitudinal arms flexibly connected at their front ends to the front frame tool bar and a floating brace pivoted at its ends to said super structure and to said rear frame tool bar to permit upward tilting of said rear frame relative to said front frame.

A further object is to provide a spring tooth harrow with a rigid tool mounting unit adapted for connection with a power operated lift hitch at multiple points spaced laterally and vertically, a rear rigid tool mounting unit connected for upward tilting relative to said front unit above a predetermined lift position and ground engaging means carried by the rear frame for controlling the working depth of the implement tools.

A further object is to provide a novel, simple, inexpensive, strong and light weight construction of a lift type agricultural implement which can be lifted effectively by a lift hitch connected at its front end and whose rear portion has a free floating action in use.

Other objects will be apparent from the following specification.

Figure 1:
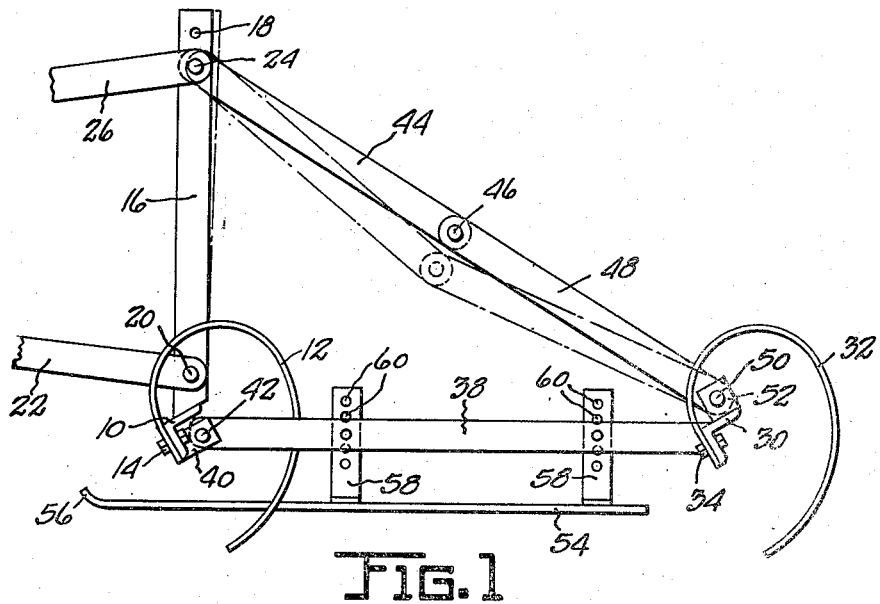
Fig. 1 is a view of a spring tooth harrow embodying my invention and illustrated in side elevation.

I have elected to illustrate my invention as embodied in and applied to the construction of a spring tooth harrow, and numeral 10 of the drawing designates a front rigid transverse tool bar which may be of any suitable shape and construction, being here illustrated as an angle iron. The tool bar 10 mounts a plurality of spring teeth 12 of conventional construction in spaced relation along its length. Any suitable means may be employed to secure the spring teeth 12 to the tool bar 10, the same being illustrated herein as the nuts and bolts 14, but it being understood that such parts are illustrative only of an operative connector between the spring teeth and the tool bar 10.

A rigid superstructure is fixedly secured to and projects above the front tool bar 10. This superstructure may comprise an A-frame formed of a pair of rigid arms 16 welded or otherwise fixedly secured to the frame members 10 at their lower ends and arranged in upwardly converging relation and provided with suitable means, such as crosspin 18, fixedly connecting their upper ends. The lower portions of the arms 16 mount connector pins 20 to which the tension links or arms 22 of a power operated lift hitch may be connected. A pin 24 carried by the upper ends of the superstructure member 16 is provided for connection with the compression link 26 of a lift hitch. The lift hitch for which this implement is designed is of the type having three or more longitudinal arms spaced apart laterally and vertically so that the upper arm 26 is placed in compression and the lower arms 22 are placed in tension during use of the hitch to connect an implement to a tractor in position to permit ground working operation of the implement. The power actuated means of the hitch (not shown) serves to swing the arms upwardly in such a manner that the implement connected to the hitch may be lifted upwardly to a transport position spaced above ground level.

Figure 2:
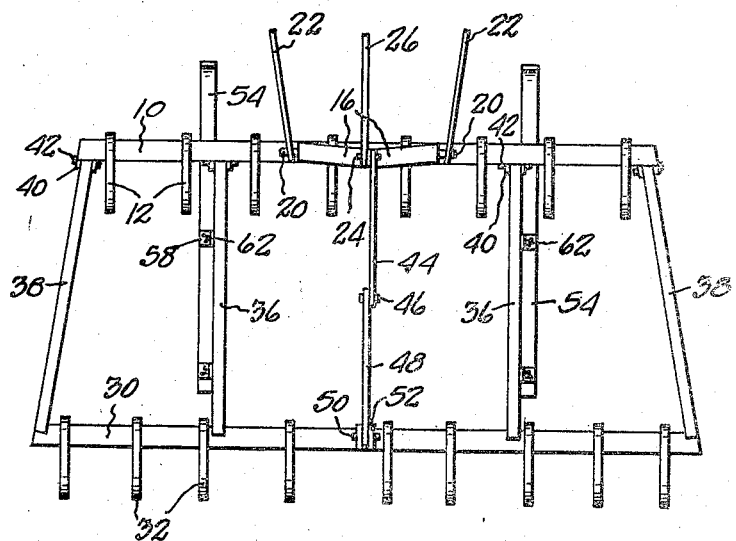
Fig. 2 is a reduced top plan view of the spring tooth harrow.

The harrow includes a rigid rear transverse tool bar 30 which mounts a plurality of spring teeth 32 secured thereto by the securing means 34. The rear tool unit 30, 32, 34 may be of the same construction as the front tool unit 10, 12, 14, although in practice, as illustrated in Fig. 2, it will be of a different length than the front tool unit so that it may carry a different number of spring teeth 32 than the number of spring teeth 12. The spring teeth 30 are arranged in staggered relation to the spring teeth 12, as best seen in Fig. 2.

A plurality of longitudinal rigid arms or bars are welded or otherwise fixedly secured at their rear ends to the tool bar 30, said bars preferably comprising a pair of intermediate longitudinal bars 36 spaced inwardly from the ends of the tool bar 30 and outer arms 38 which extend at an angle to the line of draft so that the front ends may terminate adjacent the ends of the front tool bar 10. The front ends of each of the arms 36, 38 are flexibly connected to the front tool bar 10 at spaced points along the length thereof. For purposes of illustration there is shown herein a construction in which plates 40 are fixedly secured to and project rearwardly from the front member 10 and mount pivot pins 42 passing through openings in the front ends of the arms 36 and 38. Such a pivotal connection of the arms 36, 38 with the front frame member 10 serves its intended purpose effectively but is shown for purposes of illustration only, it being understood that other types of flexible connections which permit free movement of the arms 36, 38 and the rear tool bar 30 relative to the front tool bar 10 may be employed. Thus short links, chains or flexible cables may be employed to connect the arms 36, 38 to the front tool bar 10 if desired.

A flexible member is connected at one end to the upper end of the super structure 16 and at its other end to the rear tool bar 30 and serves to suspend the rear tool bar when the implement is elevated above ground level by the hitch arms 22, 26. The flexibility of this member, together with the flexible connection of the arms 36, 38 with the front tool bar 10, permits the rear tool bar to have a vertical upward free floating action relative to the front tool bar in the use of the implement but limits the downward tilting of said rear tool bar relative to the front tool bar when the implement is lifted. This flexible member may comprise a cable, chain or a foldable brace member. The latter is here illustrated and comprises a rigid bar 44 pivoted at one end to the pin 24 or to any selected point on the upper end of the super structure 16. The opposite end of the bar 44 is pivoted at 46 to one end of a second rigid bar 48. The bar 48 is pivoted at 50 to a plate 52 rigidly secured to and projecting forwardly from the tool bar 30.

It is desirable in a spring tooth harrow to provide means for regulating the working depth of the spring teeth, and it is the object of the present invention to mount this depth adjusting means upon the rigid rear unit of the implement. Thus there are here illustrated a pair of elongated longitudinal runners or shoes 54 whose forward ends are curved upwardly at 56. Each of the runners 54 fixedly mounts a rigid upright 58 which is secured to the adjacent bar 36 in any selected position. For purposes of illustration of the means for adjusting the point of connection between the uprights 58 and the frame member 36, I have illustrated a set of vertically spaced apertures 60 formed in each of the uprights 58 adapted to receive a pin 62 which fits in an aperture in the frame member 36.

It will be apparent that when the spring tooth harrow is operatively connected to a tractive vehicle (not shown) by means of the connections of the hitch arms 22 and 26 at connectors 20, 24, respectively, the front tool bar 10 will be positioned closely adjacent the rear wheels of the tractor, while the rear tool bar 30 will be spaced rearwardly a substantial distance from the tractor. Consequently, if the longitudinal attitude of the tractor changes, as in the event of one of the tractor wheels seating in a depression in the ground level, the relation of the spring teeth 12 and their working engagement with the ground will not be affected greatly because of the close spacing thereof to the rear wheels of the tractor. However, if the rear spring teeth 32 were held in a fixed relation to the tractor through means of a rigid structure, the spacing thereof from the rear wheels, coupled with the lever function of the rigid hitch and frame of the implement, would cause the rear teeth to dig into the ground to a much greater depth than the front teeth. This action would impose great stress and strain on both the tractor and the implement. Such action cannot occur in the construction illustrated because of the flexible connection of the rear tool unit to the front tool unit which permits the rear spring teeth 32 to maintain a constant working relation to the ground, or specifically permits the arms 36, 38 to swing upwardly relative to the front tool unit whose rigid frame parts 10, 16 bear a constant relation to the tractor and have transmitted thereto all changes in the attitude of the tractor. Therefore, it will be apparent that as to the rear tool unit 30, 32, a free floating action is provided, and any longitudinal tilting of the tractor which may occur has no effect upon the rear tools 32. Observe in this connection the dotted line positions of the parts in Fig. 1 which illustrate a rearward tilting condition of the tractor together with a folding or relative pivotal movement of the bars 44, 48 out of alignment to permit the upward swinging of the rear tool bar 30. This flexibility in no way interferes with the operation of lifting the implement to transport position elevated above the ground. Thus it will be apparent that if the lift is operated to swing the arms 22, 26 upwardly and raise the front frame and tool unit of the implement, the rear tool unit must follow and cannot tilt downwardly to drag on the ground after the front frame unit is lifted clear of the ground. As soon as this lifting action commences, any slack in the suspension connector 44, 48 is taken up as by resumption of a straight position by said parts, and thereafter the members 44, 48 serve to define one side of a triangle whose other sides are formed by the structure 16 and the arms 36, 38, thereby holding the rear tool bar 30 in fixed relation to the front tool bar 10 so that said rear tool bar 30 is raised clear of the ground simultaneously with the front tool bar 10.

While the principal advantages of this device have been referred to above as constituting the provision of flexibility without interference with lifting action, the device has other important advantages. One of these advantages is the fact that the rear rigid frame unit, constituting the tool bar 30 and its connected arms 36, 38, may be disconnected from the front rigid frame parts to permit compact packing of the parts for transport and for storage. Thus it will be apparent that upon release of the pivot pins 42 and 50, the parts are disassembled and that these parts can be readily assembled at their destination. Another advantage of the construction is its simplicity, which holds its cost and its weight to a minimum.

While the invention has been illustrated and described herein as applied to a spring tooth harrow, it will be apparent that the invention may be embodied in other implements, such as spike tooth harrows, disk harrows and cultivators, by the same expedient of providing two rigid frame parts therefor, constituting a front frame part including a front gang of ground engaging tools, and a rigid superstructure, and a rear rigid frame mounting one or more sets of ground working tools spaced rearwardly from the front set and including connectors for flexible connection with the front frame, and then providing further a flexible suspension member for connecting the rear portion of the rear frame with the upper portion of the superstructure of the front frame in the same manner in which the parts are arranged and connected in a spring tooth harrow as illustrated.

While the preferred embodiment of the invention has been illustrated and described herein, it will be understood that changes in the construction thereof may be made within the scope of the appended claims without departing from the spirit of the invention.

I claim:

1. An agricultural implement of the lift type adapted for connection with a lift hitch, comprising a rigid front frame having a transverse member and a superstructure fixed on and positioned above said transverse member, a plurality of spaced attachment members carried by said frame and including at least one carried by said superstructure, a transverse set of ground working tools carried by said frame, a rigid rear frame having a transverse member and a plurality of longitudinal arms, pivots connecting the front ends of said arms with the front frame on pivot axes parallel to the transverse member thereof, a transverse set of ground working tools carried by said rear frame, and a folding brace pivoted at one end to the upper end of said superstructure and at its opposite end to the rear frame adjacent to the transverse member thereof.

2. An agricultural implement of the lift type adapted for connection with a lift hitch, comprising a rigid front frame having a transverse member and a superstructure extending upwardly from said transverse member, a plurality of spaced attachment members carried by said frame and including at least one carried by said superstructure, a transverse set of ground working tools carried by said frame, a rigid rear frame having a tranvserse member and a plurality of longitudinal arms, pivots connecting the front ends of said arms with the front frame adjacent to the transverse member thereof, a transverse set of ground working tools carried by said rear frame, and a foldable brace associated with said superstructure and rear frame for limiting downward pivoting of said rear frame to hold said frames in predetermined relation for lifting purposes.

3. An agricultural implement of the lift type adapted for connection with a lift hitch, comprising front and rear rigid transverse tool bars, a plurality of ground working tools carried by each bar, a rigid superstructure fixedly secured to and projecting upwardly from said front bar and cooperating therewith to define a front frame, a plurality of spaced attachment members carried by said front frame and including at least one carried by said superstructure, a plurality of laterally spaced longitudinal arms fixedly secured to said rear tool bar and pivoted at their front ends to said front frame, and a foldable brace carried by the upper end of said superstructure and connected to said rear bar.

4. A lift type spring tooth harrow comprising a rigid front frame including a transverse tool bar and a superstructure projecting upwardly from said tool bar, a plurality of spring teeth secured to said tool bar, spaced attachment members carried by said front frame and including at least one carried by said superstructure, a rigid rear frame pivoted to said front frame adjacent to said tool bar and including a transverse tool bar spaced rearwardly from said front tool bar, a plurality of spring teeth secured to said last named tool bar, and a foldable brace connected at one end to the upper part of said superstructure and at its other end to said rear frame in rearwardly spaced relation to the pivot connection between said front and rear frames, said foldable brace being adapted to suspend said rear frame in selected relation to said front frame when said harrow is elevated by a hitch secured thereto at said attachment members.

5. A lift type spring tooth harrow comprising a rigid front frame including a transverse tool bar and a superstructure projecting upwardly from said tool bar, a plurality of attachment members carried by said front frame and including at least one carried by said superstructure, a rigid rear frame pivotally connected to and about an axis parallel to said front frame adjacent to said tool bar, said rear frame including a transverse tool bar, a pair of sets of spring teeth each secured to one of said tool bars, and a foldable brace secured at one end to the upper part of said superstructure and at its other end to said rear frame adjacent to the tool bar thereof.

6. A lift type spring tooth harrow comprising a rigid front frame including a transverse tool bar and a substantially upright superstructure, a plurality of attachment members carried by said front frame and including at least one carried by said superstructure, a rigid rear frame pivotally connected to said front frame adjacent to and about an axis parallel to said tool bar, said rear frame including a transverse tool bar, a pair of sets of spring teeth each secured to one of said tool bars, and a foldable brace secured at one end to the upper part of said superstructure and at its other end to said rear frame adjacent to the tool bar thereof, and a longitudinal ground engaging runner carried by said rear frame.

7. A lift type spring tooth harrow comprising a rigid front frame including a transverse tool bar and a substantially upright superstructure, a plurality of attachment members carried by said front frame and including at least one carried by said superstructure, a rigid rear frame pivotally connected to said front frame adjacent to and about an axis parallel to said tool bar, said rear frame including a transverse tool bar, a pair of sets of spring teeth each secured to one of said tool bars, and a flexible connector secured at one end to the upper part of said superstructure and at its other end to said rear frame adjacent to the tool bar thereof and spaced rearwardly from said pivot axis, a pair of longitudinal ground engaging runners, and adjustable means for securing said runners to said rear frame.

8. A lift type spring tooth harrow comprising a rigid front frame including a transverse tool bar and a substantially upright superstructure, a plurality of attachment members carried by said front frame and including at least one carried by said superstructure, a rigid rear frame pivotally connected to said front frame adjacent to and on an axis parallel to said tool bar, said rear frame including a transverse tool bar, a pair of sets of spring teeth each secured to one of said tool bars, and a pair of pivotally connected bars defining a folding brace and pivoted at their outer ends to the upper part of said superstructure and to the rear frame adjacent to said tool bar, respectively.

9. The combination with a tractive vehicle mounting a power actuated lift hitch having three hitch arms spaced laterally and vertically, of an implement comprising two transverse ground working members arranged in tandem, a substantially upright superstructure fixedly secured to said front member to define a rigid front unit, three attachment members spaced laterally and vertically and carried by said front unit, longitudinal rigid arms pivoted to said front member about a transverse horizontal axis and rigidly secured to said rear member, and a foldable brace secured at one end to the upper part of said superstructure and to the rear member at its other end.

10. The combination with a tractive vehicle mounting a power actuated lift hitch, having three hitch arms spaced laterally and vertically, of an implement comprising two transverse ground working members arranged in tandem, a substantially upright superstructure fixedly secured to said front member to define a rigid front unit, three attachment members carried by said front unit in laterally and vertically spaced relation, longitudinal rigid arms pivoted to said front member and rigidly secured to said rear member, a foldable brace secured at one end to the upper part of said superstructure and to the rear member at its other end, and a depth control member carried by at least one of said arms.

JABEZ A. LOVE.

References Cited in the file of this patent

UNITED STATES PATENTS

| Number | Name | Date |
| --- | --- | --- |
| 455,181 | Doughty | June 30, 1891 |
| 1,547,271 | Toney | July 28, 1925 |
| 1,556,508 | Hentzell et al. | Oct. 6, 1925 |
| 2,005,555 | Morkovski | June 18, 1935 |
| 2,118,181 | Ferguson | May 24, 1938 |
| 2,171,451 | Madden | Aug. 29, 1939 |
| 2,322,076 | Watson | June 15, 1943 |
| 2,333,586 | Rude | Nov. 2, 1943 |
| 2,336,152 | Rude | Dec. 7, 1943 |
| 2,336,848 | Cruse | Dec. 14, 1943 |
| 2,363,749 | Rude | Nov. 28, 1944 |
| 2,398,147 | McKay | Apr. 9, 1946 |